United States Patent
Challa et al.

(10) Patent No.: US 7,395,961 B2
(45) Date of Patent: *Jul. 8, 2008

(54) SYSTEM, METHOD, AND APPARATUS FOR COMMUNICATING INFORMATION BETWEEN A MOBILE COMMUNICATIONS DEVICE AND A BAR CODE SCANNER

(75) Inventors: Nagesh Challa, Saratoga, CA (US); Venkata T. Gobburu, San Jose, CA (US)

(73) Assignee: ecrio, inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/369,190

(22) Filed: Mar. 6, 2006

(65) Prior Publication Data
US 2006/0202035 A1  Sep. 14, 2006

Related U.S. Application Data (63) Continuation of application No. 10/770,343, filed on Feb. 2, 2004, now Pat. No. 7,028,906, which is a continuation of application No. 09/963,218, filed on Sep. 25, 2001, now Pat. No. 6,685,093.

(51) Int. Cl.
*G06K 15/00* (2006.01)
(52) U.S. Cl. ............... 235/383; 235/472.01; 235/462.46
(58) Field of Classification Search ............ 235/462.13, 235/472.01, 462.46, 454, 383; 455/567, 455/556.1, 566, 95
See application file for complete search history.

(56) References Cited

U.S. PATENT DOCUMENTS

| | | | |
|---|---|---|---|
| 3,993,861 A | 11/1976 | Baer | |
| 4,329,684 A | 5/1982 | Monteath et al. | |
| 4,403,869 A | 9/1983 | Crutcher | |
| 4,613,904 A | 9/1986 | Lurie | |
| 4,736,096 A | 4/1988 | Ushikubo | |
| 4,879,540 A | 11/1989 | Ushikubo | |
| 4,990,756 A | 2/1991 | Hoemann | |
| 4,999,617 A | 3/1991 | Uemura et al. | |

(Continued)

FOREIGN PATENT DOCUMENTS

EP          01355258 A2    10/2003

(Continued)

OTHER PUBLICATIONS

Aeritas Inc., New Wireless Check-In and Security for Travel—Aeritas Freedom Pass™ [online], [retrieved on Feb. 5, 2002]. Retrieved from the Internet <URL: http://www.aeritas.com/>.

(Continued)

*Primary Examiner*—Ahshik Kim
(74) *Attorney, Agent, or Firm*—Cyr & Associates, P.A.

(57) ABSTRACT

A system, method, and apparatus for communicating information encoded in a bar code format between a mobile communications device and a bar code scanner. Transmission information data is encoded into a bar code format. A signal is generated from the bar code format to simulate a reflection of a scanning beam being moved across a static visual image of the bar code format; and the signal is transmitted as light pulses from the mobile communications device.

35 Claims, 10 Drawing Sheets

U.S. PATENT DOCUMENTS

| | | | |
|---|---|---|---|
| 5,059,778 | A | 10/1991 | Zouzoulas et al. |
| 5,468,946 | A | 11/1995 | Oliver |
| 5,488,571 | A | 1/1996 | Jacobs et al. |
| 5,523,794 | A | 6/1996 | Mankovitz et al. |
| 5,570,297 | A | 10/1996 | Brzezinski et al. |
| 5,640,002 | A | 6/1997 | Ruppert et al. |
| 5,682,030 | A | 10/1997 | Kubon |
| 5,760,383 | A | 6/1998 | Heske, III |
| 5,850,304 | A | 12/1998 | Elmers et al. |
| 5,880,769 | A | 3/1999 | Nemirofsky et al. |
| 5,953,047 | A | 9/1999 | Nemirofsky |
| 6,036,086 | A | 3/2000 | Sizer, II et al. |
| 6,041,374 | A | 3/2000 | Postman et al. |
| 6,082,620 | A | 7/2000 | Bone, Jr. |
| 6,119,943 | A | 9/2000 | Christy |
| 6,281,820 | B1 | 8/2001 | Fields |
| 6,318,631 | B1 | 11/2001 | Halperin |
| 6,679,421 | B2 | 1/2004 | Shin et al. |
| 6,685,093 | B2 * | 2/2004 | Challa et al. ............ 235/462.46 |
| 6,736,322 | B2 * | 5/2004 | Gobburu et al. ........ 235/462.46 |
| 6,854,652 | B2 | 2/2005 | Omori |
| 6,877,665 | B2 * | 4/2005 | Challa et al. ................. 235/375 |
| 6,942,151 | B2 * | 9/2005 | Ehrhart .................. 235/462.25 |
| 7,028,906 | B2 | 4/2006 | Challa et al. |
| 2004/0019792 | A1 | 1/2004 | Funamoto et al. |

FOREIGN PATENT DOCUMENTS

| | | |
|---|---|---|
| GB | 2 183 116 A | 5/1987 |
| GB | 2 228 641 A | 8/1990 |
| JP | 02280287 | 11/1990 |
| JP | 05250010 | 9/1993 |
| WO | WO 00/03328 | 1/2000 |

OTHER PUBLICATIONS

Aeritas Inc., Aeritas Soluations—Overview [on-line], [retrieved on Feb. 5, 2002]. Retrieved from the Internet <URL: http//www.aeritas.com/aeritas.jsp?function=solutions&sub=overview>.

Aeritas Inc., Aeritas Solutions—Platform [on-line], [retrieved on Feb. 5, 2002]. Retrieved from the Internet <URL: http//www.aeritas.com/aeritas.jsp?function=solutions&sub=platform>.

Aeritas Inc., Electronic Barode Solution Works with Various Wireless Devices [on-line], [retrieved on Feb. 5, 2002]. Retrieved from the Internet <URL: http//www.aeritas.com/aeritas.jsp?function=solutions&sub=barcode>.

Aeritas Inc., New Fast-Track Wireless Check-In and Security Solution [on-line], [retrieved on Feb. 5, 2002]. Retrieved from the Internet <URL: http//www.aeritas.com/aeritas.jsp?function=solutions&sub=travel>.

Aeritas Inc., Aeritas Solutions—AeritasAer Wallet [on-line], [retrieved on Feb. 5, 2002]. Retrieved from the Internet <URL: http//www.aeritas.com/aeritas.jsp?function=solutions&sub=voice>.

Aeritas Inc., Aeritas Custom Solutions—Incorporate Aeritas FreedomPass™ Line-Busting Technology for Your Customers Today![on-line], [retrieved on Feb. 5, 2002]. Retrieved from the Internet <URL: http//www.aeritas.com/aeritas.jsp?function=solutions&sub=custom>.

Aeritas Inc., Company—Aeritas, Inc. [on-line], [retrieved on Feb. 5, 2002]. Retrieved from the Internet <URL: http//www.aeritas.com/aeritas.jsp?function=company&sub=aeritasinc>.

Aeritas Inc., Company—Contact Us[on-line], [retrieved on Feb. 5, 2002]. Retrieved from the Internet <URL: http//www.aeritas.com/aeritas.jsp?function=solutions&sub=contact>.

Aeritas Inc., Press Releases—Welcome to the Aeritas Media Room [online], [retrieved on Feb. 5, 2002]. Retrieved from the Internet <URL:http//www.aeritas.com/aeritas.jsp?function=press&sub=news>. et. seq.

Aeritas Inc., Press—Aeritas-Related Press Articles [on-line], [retrieved on Feb. 5, 2002]. Retrieved from the Internet <URL: http//www.aeritas.com/aeritas.jsp?function=press&sub=articles>.

Conlon, Michael. Reuters.com Away on Business: Electronic Security, Nov. 22, 2001 [on-line], [retrieved on Feb. 5, 2002]. Retrieved from the Internet <URL: http//www.aeritas.com/includes/press/reuters-11-22-01.htm>.

Goldstein, Alan. The Dallas Morning News. Stalled at the Gate, Firm Checks in New Plan, Nov. 14, 2001 [online], [retrieved on Feb. 5, 2002]. Retrieved from the Internet <URL:http//www.aeritas.com/includes/press/dmn1114.htm>.

Wireless Developer Network News. Two Entrepreneurs Flying High on Sep. 11!, Nov. 14, 2001 [online], [retrieved on Feb. 5, 2002]. Retrieved from the Internet <URL:http//www.aeritas.com/includes/press/devnet1114.htm>.

m-Travel.com. Aeritas Launches Secure Wireless Check-In With Barcode, Nov. 9, 2001 [online], [retrieved on Feb. 5, 2002]. Retrieved from the Internet <URL:http//www.aeritas.com/includes/press/mtravel1109.htm>.

Europe News. FreedomPass™ Provides Increased Security and Reduces Airport Congestion, Nov. 8, 2001 [online], [retrieved on Feb. 5, 2002]. Retrieved from the Internet <URL:http//www.aeritas.com/includes/press/euronews 1108.htm>.

M Business Daily. Aeritas Launches Wireless Check-In and Security Service, Nov. 8, 2001 [online], [retrieved on Feb. 5, 2002]. Retrieved from the Internet <URL:http//www.aeritas.com/includes/press/mbd1108.htm>.

Smith, Brad. Wireless Week.com. Resuming Mobility—Airlines Cautiously Reinstate Wireless Check-In, Oct. 29, 2001 [online], [retrieved on Feb. 5, 2002]. Retrieved from the Internet <URL:http//www.aeritas.com/includes/press/wwc1029.htm>.

Closser, Stacey. Dallas-Fort Worth TechBiz. Airport Security Reinforces Need for Company's Wireless Check-In App, Oct. 22, 2001 [online], [retrieved on Feb. 5, 2002]. Retrieved from the Internet <URL:http//www.aeritas.com/includes/press/dfwtb10101.htm>.

Hobica, G. & Liang, K. Mobile Computing & Communications. Now Boarding: All Phones, [online], [retrieved on Feb. 5, 2002]. Retrieved from the Internet <URL:http//www.aeritas.com/includes/press/mobilecomputing.html>.

WirelessWeek.com. Site of the Week—Aeritas, Inc., Jul. 23, 2001 [online], [retrieved on Feb. 5, 2002]. Retrieved from the Internet <URL:http//www.aeritas.com/includes/press/WirelessWeek_com.htm>.

Johnston, David C., The New York Times. Travel Advisory—New Cell Phone Trick: It's a Boarding Pass, Jul. 22, 2001 [online], [retrieved on Feb. 5, 2002]. Retrieved from the Internet <URL:http//www.aeritas.com/includes/press/nytimes.htm>.

Speech Technology Magazine. News & Views—Siemens Business Services, Aeritas Announce Partnership, May/Jun. 2001[online], [retrieved on Feb. 5, 2002]. Retrieved from the Internet <URL:http//www.aeritas.com/includes/press/speech.htm>.

Muraskin, Ellen. Communications Convergence.com. Speaking Tour: ASR and TTS Follow the Money—Planes, Trains, Bar Codes, and Voice Verification, Jun. 5, 2001 [online], [retrieved on Feb. 5, 2002]. Retrieved from the Internet <URL:http//www.aeritas.com/includes/press/convergence.htm>.

Bounds, Jeff. Dallas Business Journal. Region Travels to Front in Reservations, Jun. 1, 2001 [online], [retrieved on Feb. 5, 2002]. Retrieved from the Internet <URL:http//www.aeritas.com/includes/press/dallas_business.htm>.

Gawlicki, Scott M. Telecom Click. Wireless Apps Get Real, Jun. 1, 2001 [online], [retrieved on Feb. 5, 2002]. Retrieved from the Internet <URL:http//www.aeritas.com/includes/press/telecomclick.htm>.

Hastings, Nick. Dow Jones Newswires. From the Floor: An Italian Job, May 30, 2001 [online], [retrieved on Feb. 5, 2002]. Retrieved from the Internet <URL:http//www.aeritas.com/includes/press/Dow%20Jones%20Interactive_files/DJInteractive.htm>.

Bray, Roger. Financial Times FT.com. Inside Track: Lufthansa Plans Check-In by Wap Travel Update, May 29, 2001 [online], [retrieved on Feb. 5, 2002]. Retrieved from the Internet <URL:http//www.aeritas.com/includes/press/financial_times.htm>.

Elacki, Joanna. CommWeb.com. Lufthansa Debuts Barcode Check-In and Boarding, May 25, 2001[online], [retrieved on Feb. 5, 2002]. Retrieved from the Internet <URL:http//www.aeritas.com/includes/press/lufthansa.htm>.

Worldroom Travel Digest. Lufthansa Launches Mobile Check-In, May 25, 2001 [online], [retrieved on Feb. 5, 2002]. Retrieved from the Internet <URL:http//www.aeritas.com/includes/press/worldroom.htm>.

McDonough, Brian. Wireless Newsfactor. Wireless Connections Let Lufthansa Customers Board on the Fly, May 24, 2001 [online], [retrieved on Feb. 5, 2002]. Retrieved from the Internet <URL:http//www.aeritas.com/includes/press/wireless_news2.htm>.

Aviation Daily. Lufthansa Inks Check-In Deal, May 24, 2001 [online], [retrieved on Feb. 5, 2002]. Retrieved from the Internet <URL:http//www.aeritas.com/includes/press/aviation_files/channel_ebiz.html>.

Eye For Travel.com, Lufthansa m-Barqs On Wireless Check-In Project, May 23, 2001 [on-line], [retrieved on Feb. 5, 2002]. Retrieved from the Internet <URL:http//www.aeritas.com/includes/press/eye_travel.htm>.

Mobileinfo.com, Lufthansa Uses Mobile Devices As Digital Boarding Pass, May 22, 2001 [on-line], [retrieved on Feb. 5, 2002]. Retrieved from the Internet <URL:http//www.aeritas.com/includes/press/mobile_info.htm>.

Closser, Stacey. Dallas-Fort Worth TechBiz, Airline Boarding Passes Made Wireless, May 22, 2001 [on-line], [retrieved on Feb. 5, 2002]. Retrieved from the Internet <URL:http//www.aeritas.com/includes/press/dfw_techbiz_052201.htm>.

Turek, Norbert. Informationweek.com News, WAP Apps Make Their Way To Biz-Critical Services, Mar. 19, 2001 [on-line], [retrieved on Feb. 5, 2002]. Retrieved from the Internet <URL:http//www.aeritas.com/includes/press/information.htm>.

Houck, J. B. Wireless Newfactor, Have PDA? Will Travel, Mar. 16, 2001 [on-line], [retrieved on Feb. 5, 2002]. Retrieved from the Internet <URL:http//www.aeritas.com/includes/press/wireless_news.htm>.

Carter, Wayne. Dallas Localbusiness.com, Aeritas wants to bring mobile commerce customers on board, Mar. 15, 2001 [on-line], [retrieved on Feb. 5, 2002]. Retrieved from the Internet <URL:http//www.aeritas.com/includes/press/localbusiness.htm>.

Klitsgaard, Niels. Global Bluetooth Tracking, Newsletter, Mar. 14, 2001 [on-line], [retrieved on Feb. 5, 2002]. Retrieved from the Internet <URL:http//www.aeritas.com/includes/press/bluetags_files/Newsletter1.asp>.

Global Wireless, Siemens Teams up for m-commerce travel service, Mar. 2, 2001 [on-line], [retrieved on Feb. 5, 2002]. Retrieved from the Internet <URL:http//www.aeritas.com/includes/press/global_news.htm>.

Boyter, Scott. Dallas-Fort Worth TechBiz, Aeritas signs deal with Siemens for European travel application, Mar. 2, 2001 [on-line], [retrieved on Feb. 5, 2002]. Retrieved from the Internet <URL:http//www.aeritas.com/includes/press/DFWTB-3-2-01.htm>.

Conlon, Michael. Reuters Technology, Away on Business: With the Wave of a Phone, Feb. 24, 2001 [on-line], [retrieved on Feb. 5, 2002]. Retrieved from the Internet <URL:http//www.aeritas.com/includes/press/SVNews2-24-2001.htm>.

Boyter, Scott. Dallas-Fort Worth TechBiz, Aeritas tries to fill void until 3G wireless is ready; Mobile boarding pass is just on application being tested, Feb. 19, 2001 [on-line], [retrieved on Feb. 5, 2002]. Retrieved from the Internet <URL:http//www.aeritas.com/includes/press/DFWTechBiz.htm>.

Goldstein, Alan. DallasNews.com, The Dallas Morning News, Impulsity a new voice in mobile commerce; Dec. 27, 2000, [on-line], [retrieved on Feb. 5, 2002]. Retrieved from the Internet <URL:http//www.aeritas.com/includes/press/DMN-Ag.htm>.

Petersen, A. & Harris, N. The Wall Street Journal, WSJ.com, Wireless Web's Vast Promises Have So Far Been Unkept in U.S., Dec. 1, 2000 [online], [retrieved on Feb. 5, 2002]. Retrieved from the Internet <URL:http//www.aeritas.com/includes.press/wsj.htm>.

Goldstein, A. & Bajaj, V. The Dallas Morning News, DallasNews.com, Rush toward Wireless devices collides with reality of what they deliver, Nov. 30, 2000 [online], [retrieved on Feb. 5, 2002]. Retrieved from the Internet <URL:http//www.aeritas.com/includes/press/DallasMorningNews.htm>.

Meehan, Michael. Computerworld, Sabre Rolling out wireless check-in system for air travelers, Oct. 20, 2000 [on-line], [retrieved on Feb. 5, 2002]. Retrieved from the Internet <URL:http//www.aeritas.com/includes/press/Computerworld.htm>.

Wireless Today, Wireless Could be Cure for Traveler's Airport Woes [on-line], [retrieved on Feb. 5, 2002]. Retrieved from the Internet <URL:http//www.aeritas.com/includes/pressWirelessToday10-19.htm>.

Piller, Dan. Star-Telegram.com, Wireless airport check-in to use cell phones, hand-held computers, Oct. 18, 2000 [on-line], [retrieved on Feb. 5, 2002]. Retrieved from the Internet <URL:http//www.aeritas.com/includes/press/StarTelegram.htm>.

Aeritas Inc. Press—What's the Buzz?[on-line], [retrieved on Feb. 5, 2002]. Retrieved from the Internet <URL:http//www.aeritas.com/Aeritas.jsp?function=press&sub=buzz>.

Aeritas Inc., Sitemap [on-line], [retrieved on Feb. 5, 2002]. Retrieved from the Internet <URL:http//www.aeritas.com/aeritas.jsp?function=sitemap>.

* cited by examiner

SYSTEM, METHOD, AND APPARATUS FOR COMMUNICATING INFORMATION BETWEEN A MOBILE COMMUNICATIONS DEVICE AND A BAR CODE SCANNER

CROSS-REFERENCE TO RELATED APPLICATIONS

This patent is a continuation of and claims the benefit of prior U.S. patent application Ser. No. 10/770,343 filed Feb. 2, 2004, now U.S. Pat. No. 7,028,906 issued Apr. 18, 2006 (Challa, et al., "System, Method and Apparatus for Communicating Information Between a Mobile Communications Device and a Bar Code Scanner"), which is a continuation of U.S. patent application Ser. No. 09/963,218 filed Sep. 25, 2001, now U.S. Pat. No. 6,685,093 issued Feb. 3, 2004 (Challa, et al., "System, Method and Apparatus for Communicating Information Between a Mobile Communications Device and a Bar Code Reader"), all of which are hereby incorporated herein by reference thereto in their entirety, as though fully set forth herein.

BACKGROUND OF THE INVENTION

1. Field of the Invention

This invention relates generally to communicating information encoded in a bar code format, and more specifically to systems, methods, and apparatuses for communicating that information encoded in a bar code format from a mobile communications device to a bar code scanner.

2. Description of the Related Art

The use of bar code scanners in a great many aspects of everyday life is commonplace. Bar code scanners are found in many different types of facilities, including supermarkets, airport security, check-in and boarding areas, stadiums, libraries, test centers, conference centers, and many other places. The use of bar code scanners has dramatically increased the speed at which many commonplace transactions can be completed.

While typically printed on paper labels and stubs, bar codes many also be presented on the electronic displays of electronic devices such as mobile communications devices. For example, in International Publication No. WO 00/03328 dated Jan. 20, 2000, Motorola Inc. of Schaumburg, Ill., describes the display of bar coded information on a selective call receiver ("SCR"). Demographic information concerning the user of the SCR is stored in the SCR. The demographic information is visually displayed on the SCR as a bar code such that it can be read by a bar code scanner, as in a store or at a point-of-sale. A stored coupon may also be displayed in bar code format so that it can be read and redeemed at the point-of-sale. A stored affinity card code and a unique identifier may also be displayed in bar code format so that they can be read to identify a selected affinity group and the customer at the point-of-sale. As a further example, Aeritas Inc. of Dallas, Tex., has proposed using voice recognition technology to allow a cellular telephone user to identify himself or herself while obtaining wirelessly from an airline computer an electronic bar coded boarding pass at the airport using only a cellular telephone. As proposed, the electronic boarding pass may be displayed as a bar code at the time of boarding on the screen of the cellular telephone so that the gate attendant may scan the boarding pass in a conventional manner.

While presenting information such as coupons and user affinity information in bar code form on a cell phone display can be quite useful, the technique has several disadvantages. Some bar code scanners, for example, cannot reliably read bar codes displayed on certain types of cellular phone displays because the contrast ratio between the bars and spaces shown on the screen, which typically is a liquid crystal display ("LCD"), is not sufficient. Further, the physical dimension and/or resolution of the display may also limit the size of the bar code that may be displayed at one time.

BRIEF SUMMARY OF THE INVENTION

The present invention includes a system, method, and apparatus for presenting information encoded in a bar code format from a mobile communications device to a bar code scanner.

One embodiment of the present invention includes a method of actively providing transmission information data to a bar code scanner from a mobile communications device. The method includes: encoding the transmission information data into a bar code format; generating a signal from the bar code format to simulate a reflection of a scanning beam being moved across a static visual image of the bar code format; and transmitting the signal as light pulses from the mobile communications device.

Another embodiment of the present invention includes a method of actively providing transmission information data to a bar code scanner from a mobile communications device. The method includes: encoding the transmission information data into a bar code format; presenting representative information of the transmission information data on a user output facility of the mobile communications device; generating a signal from the bar code format to simulate a reflection of a scanning beam being moved across a static visual image of the bar code format; and transmitting the signal as light pulses.

Yet another embodiment of the present invention includes a mobile communications device for actively providing transmission information data to a bar code scanner. The mobile communications device includes: a program component for rendering transmission information data into a bar code format; a second program component for generating a signal from the bar code format to simulate a reflection of a scanning beam being moved across a static visual image of the bar code format; and a light source for transmitting the signal as light pulses from the mobile communications device.

Another embodiment of the present invention includes a mobile communications device for actively providing transmission information data to a bar code scanner. The mobile communications device includes: a program component for rendering transmission information data into a bar code format; a second program component for generating a signal from the bar code format to simulate a reflection of a scanning beam being moved across a static visual image of the bar code format; an output facility for presenting representative information of the transmission information data on the mobile communications device; and a light source for transmitting the signal as light pulses.

Yet another embodiment of the present invention includes a mobile communications device for actively providing transmission information data to a bar code scanner. The mobile communications device includes: encoding means for encoding the transmission information data into a bar code format; presentation means for presenting representative information of the transmission information data on a mobile communications device; generating means for generating a signal from the bar code format to simulate a reflection of a scanning beam being moved across a static visual image of the bar code format; and transmission means for transmitting the signal as light pulses from a mobile communications device.

Another embodiment of the present invention includes a system for actively providing transmission information data from a mobile communications device to a bar code scanner. The system includes a server for providing transmission information data; a mobile communications device including a light source for providing a signal as light pulses to a bar code scanner; and a host for providing communications between the server and the mobile communications device. The transmission information data is encoded into a bar code format, and the signal is generated from the bar code format to simulate a reflection of a scanning beam being moved across a static visual image of the bar code format.

Another embodiment of the present invention includes a system for actively providing transmission information data from a mobile communications device to a bar code scanner. The system includes a server for providing transmission information data; a mobile communications device including a light source and an output facility; and a host for providing communications between the server and the mobile communications device. The transmission information data is encoded into a bar code format, and a signal is generated from the bar code format to simulate a reflection of a scanning beam being moved across a static visual image of the bar code format. Representative information of the transmission information data is also presented on the output facility of the mobile communications device.

DETAILED DESCRIPTION OF THE INVENTION

Figure 1A:
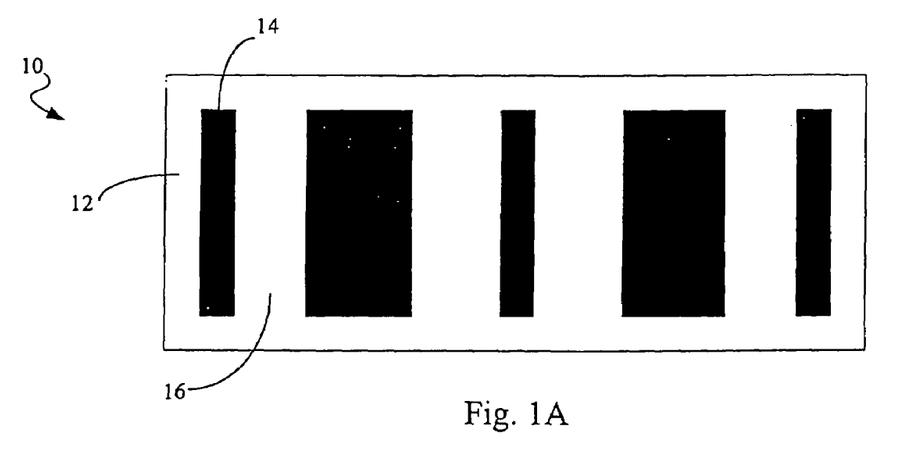
FIG. 1A is a depiction of a bar code.

FIG. 1A shows a bar code 10 that utilizes a series of vertical lines, i.e., bars 14, and spaces 16 to represent an identification code. Different combinations of the bars and spaces can be used to represent different characters.

Conventional bar code scanners include sequential bar code scanners and charge-coupled device ("CCD") bar code scanners. A sequential bar code scanner, for example, uses a scanning beam, typically narrow band light in the visible spectrum such as red laser, but potentially any bandwidth of light in the visible or infrared spectra, to pass over a sequence of bars and spaces such as bar 14 and space 16 sequentially, e.g., left to right and/or right to left. Another type of sequential scanner is a wand scanner, which is swept across the bar code by a user to create the scanning beam. As the scanning beam of light scans across the bar code 10, the beam is at least partially reflected back to the scanner by the spaces 16 and is at least partially absorbed by the dark bars 14. A receiver, such as a photocell detector, in the bar code scanner receives the reflected beam and converts the beam into an electrical signal. As the beam scans across the bar code, the scanner typically creates a low electrical signal for the spaces 16, i.e., reflected beam, and a high electrical signal for the bars 14, i.e., where the beam is absorbed. The scanner may, however, create a low electrical signal for the bars 14 and a high electrical signal for the spaces 16. The width of the elements determines the duration of the electrical signal. This signal is decoded by the scanner or by an external processor into characters that the bar code represents.

In a CCD scanner, however, the scanner takes a digital image of the bar code and decodes the barcode using software that is well known in the art to convert the elements into the identification code.

In either a sequential bar code scanner or a CCD scanner, the contrast between the bar and space elements is used to distinguish the elements and decode the bar code. A bar code displayed on an LCD screen such as on a PDA or cell phone, for example, has a lower contrast between the gray "off" state designating a space of the bar code and the black "on" state designating a bar than is available for a bar code printed on a black and white label. This lower contrast between the elements of the bar code can result in a lower reliability of the decoding process.

Figure 2:
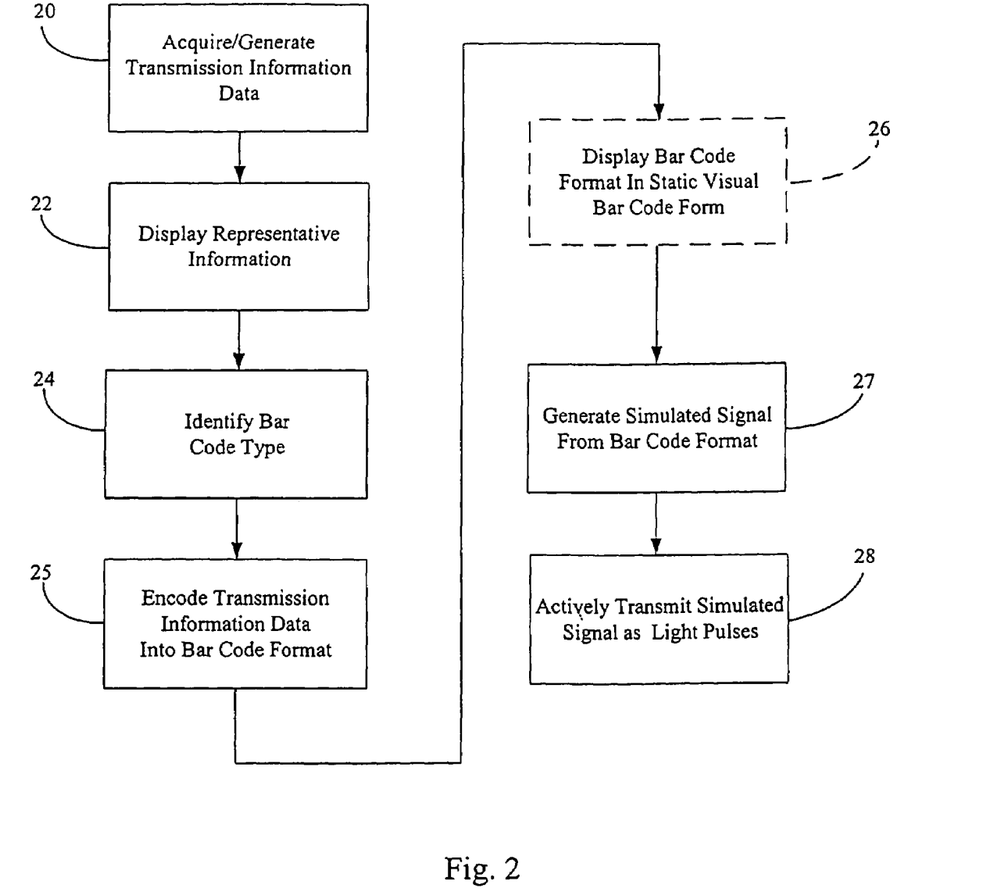
FIG. 2 is a flow chart of a method of actively providing transmission information data to a bar code scanner.

FIG. 2 shows a method of generating a signal for use with a sequential bar code scanner that simulates a bar code with light pulses. The method of FIG. 2 is particularly useful for sequential bar code scanners that use the reflection of a scanning beam being moved over a bar code. In block 20, transmission information data is acquired or generated. The transmission information data may be any type of data that one may wish to communicate while at a facility equipped with a bar code scanner, including information conventionally communicated using bar codes, as well as other types of information that are not conventionally communicated using bar codes because of, for example, physical limitations imposed by the bar code format. The transmission information data, for example, may include numeric, alphabetic, or alphanumeric data, an index, or other data values. The transmission information data may represent, for example, boarding pass information, e-ticket information, ticket information, credit card information, debit card information, automated teller machine card information, identification information, account information, electronic payment information, wire transfer information, purchase information, security information, affinity information, and so forth.

The transmission information data may be stored locally on the mobile communications device, such as in random access memory ("RAM") or read only memory ("ROM), or acquired from a remote source. The mobile communications device may include, for example, static or dynamic RAM ("SRAM" or "DRAM," respectively), FLASH memory, or any other memory known in the art. The transmission information data may be programmed into the device, entered into the device by the user, or received by the device from a remote source over any known communication technology such as wireless transmission, universal serial bus ("USB") transmission, parallel transmission, and serial transmission. The remote source may be a personal computer, a wireless operator, a server networked to the wireless operator, a peer networked to the wireless operator, a wireless data port, and so forth.

Figure 4:
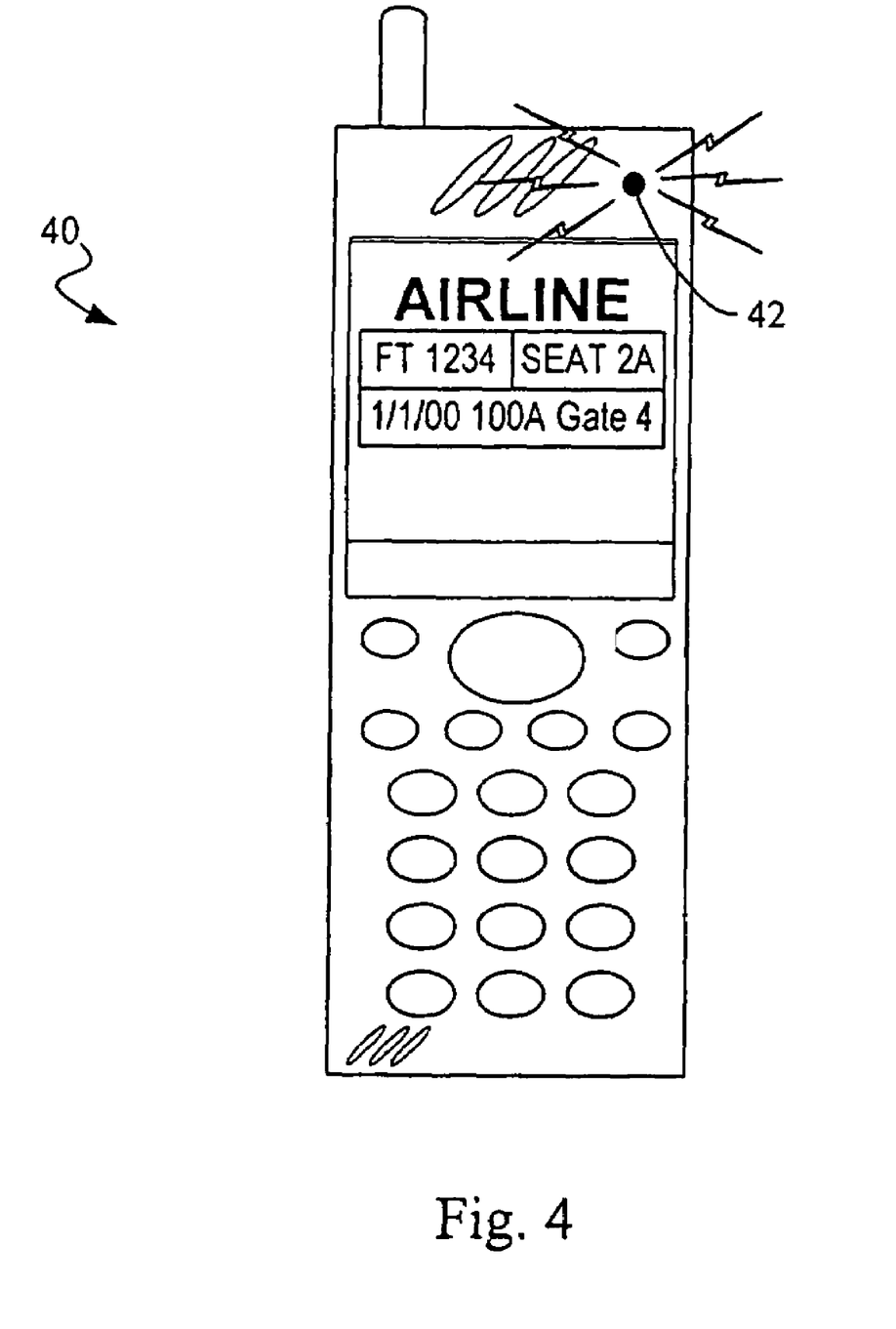
FIG. 4 is a pictorial representation of an electronic device in which an LED is used to actively provide a signal representing transmission information data to a bar code scanner.
Figure 5:
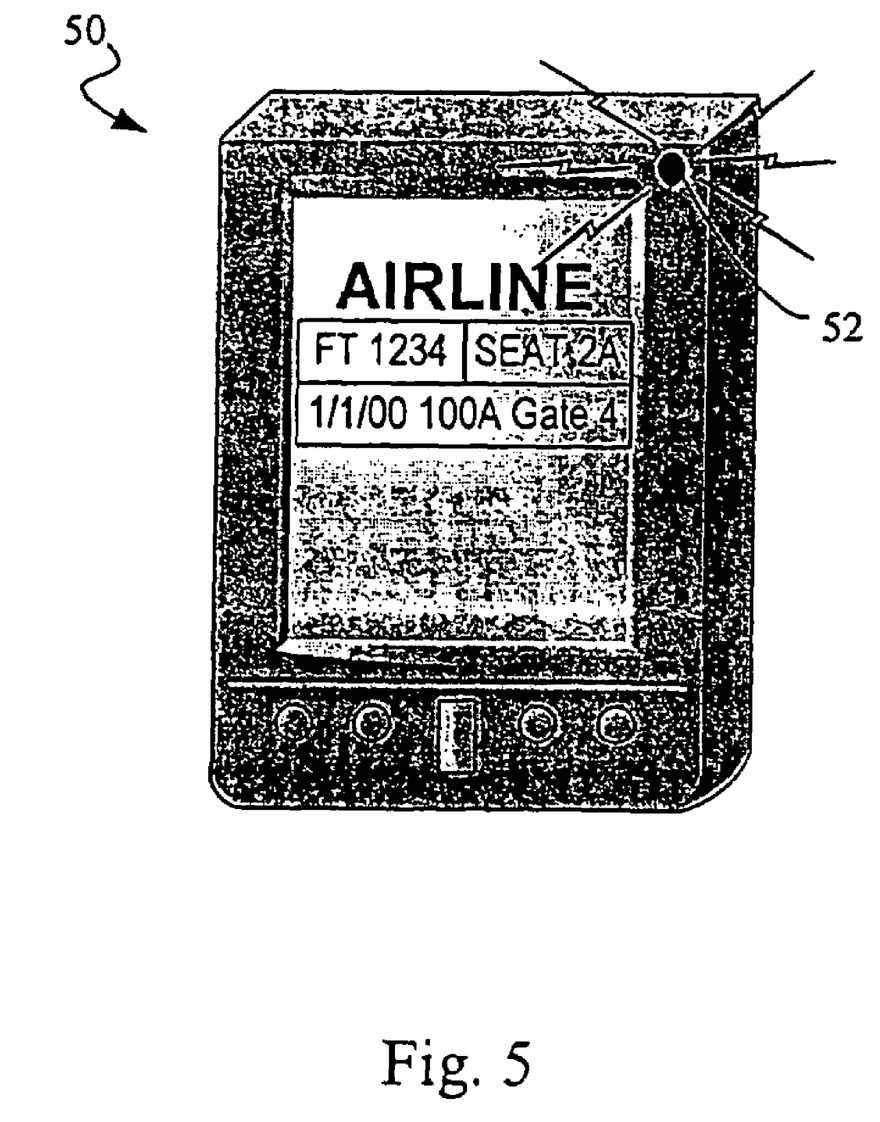
FIG. 5 is a perspective view of an alternative electronic device in which an LED is used to actively provide a signal representing transmission information data to a bar code scanner.
Figure 6:
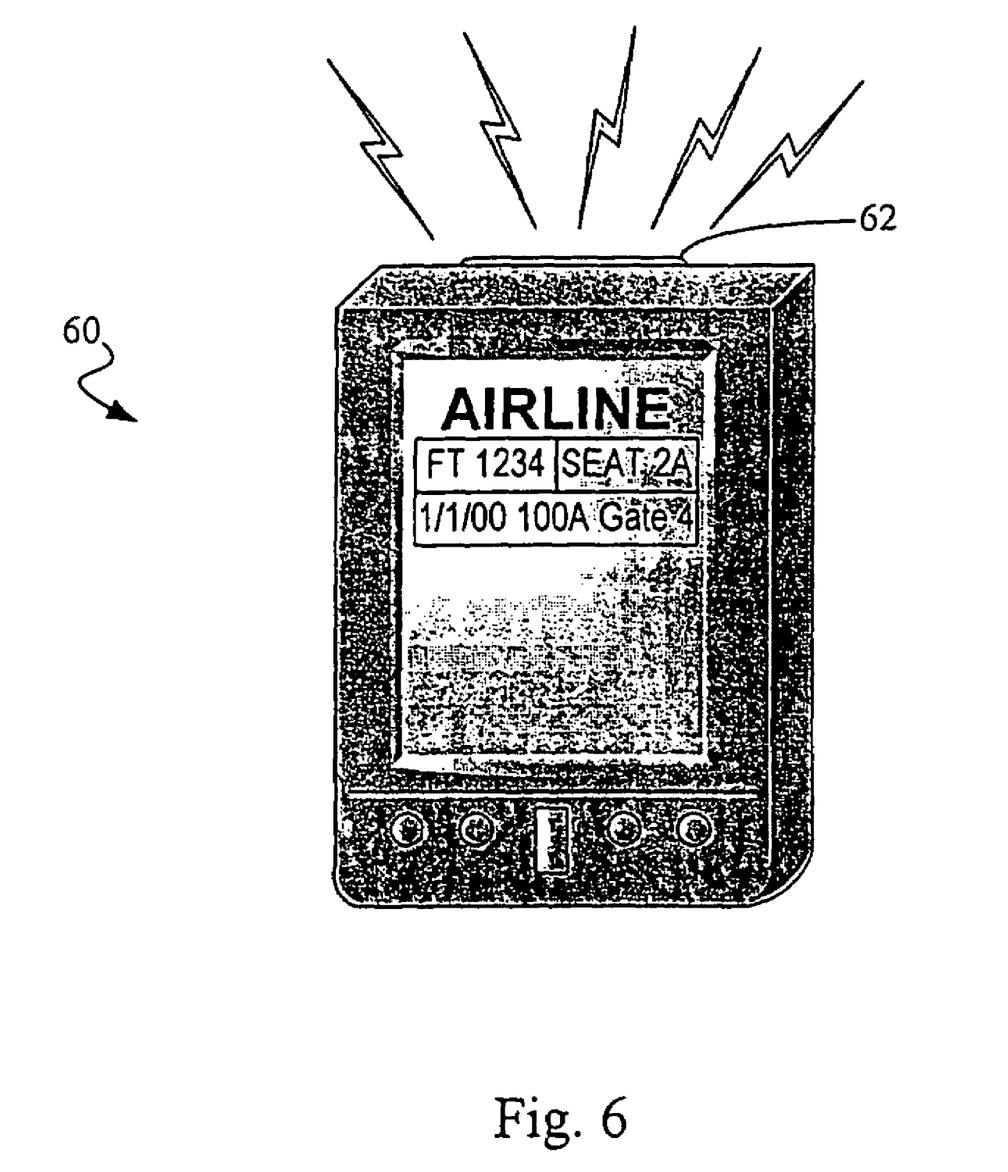
FIG. 6 is a perspective view of an electronic device in which an IR port is used to actively provide a signal representing transmission information data to a bar code scanner.

In block 22, representative information for the transmission information data that will identify the transmission information data to a user of the mobile communications device is presented on an output facility of the device. The output facility may include, for example, a display such as an LCD screen of a PDA or wireless telephone, a speaker, or any other output device for communicating with a user. The representative information may include the transmission information data itself, or may be other information that the user will associate with the transmission information data. In order to identify the desired transmission information data item, the representative information that will identify that transmission information data item may be rendered, for example, in a textual, numerical, and/or graphical form and displayed on a screen of a suitably equipped mobile communications device, or an audio message that is played over a speaker of a suitably equipped mobile communications device. In FIGS. 4, 5, and 6, for example, boarding pass information is displayed on a screen of a mobile communications device identifying the airline, the flight and seat numbers, the date and departure time of the flight, and the gate number. In this manner, the user of the mobile communications device can identify the transmission information data that is to be presented to the bar code scanner. If multiple transmission information data items are stored locally on the device and/or remotely retrieved, for example, the user can scan through them and select the appropriate transmission information data item to be presented to the bar code scanner.

In block 24, a bar code type is identified. The bar code type may be any type of barcode known in the art, such as, but not limited to, a UPC, EAN, Interleaved 2 of 5, Code 93, Code 128, and Code 39, or specially designed bar code types.

In block 25, the transmission information data is encodedinto a bar code format for the identified bar code type. The bar code format may be represented, for example, by a binary array. In a typical single-dimensional barcode, for example, the smallest width of a bar or space element of a bar code may be designated as a single element of an array. If the bar code has a width of 256 dots or pixels, and the smallest element of the bar code has a width of 4 dots or pixels, for example, a binary array having sixty four array elements (e.g., a1, a2, . . . , a64) may be used to represent the bar code format. Each array element is assigned a value depending on whether that portion of the bar code is part of a bar or a space. A bar, for example, may be designated as having a value equal to one (e.g., a1=1), and a space may be designated as having a value equal to zero (e.g., a32=0). The array may also alternatively be a two-dimensional array, such as a bit map, that may be easily displayed on a screen. In yet another example, the transmission information data may be encoded into a digital series corresponding to a bar code representation of the bar code type selected in block 24. Alternatively, the transmission information data may be encoded into any number of other formats that may correspond to the selected bar code type identified in block 24. The bar code format may also be compressed or encrypted, such as when the bar code format is to be transmitted from a remote source to the mobile communications device.

Optionally, the transmission information data may also be displayed in a visual format as well as being encoded in a bar code format such as shown in block 26. In this manner, the mobile communications device can actively provide the transmission information data to some bar code scanners such as sequential bar code scanners, and can also statically provide the transmission information data to other bar code scanners such as CCD scanners.

In block 27, a signal to simulate the reflection of a scanning beam being moved across a visual image of the bar code format of block 25 is generated from the bar code format. The simulated signal may be generated corresponding to an approximated or measured scanning rate. If the simulated signal is to be generated for a majority of the types of scanners in common use today, such as a laser scanner that utilizes a scanning rate in the range of about 30 to about 60 scans per second, the simulated signal may be generated using a scan rate within that range of scan rates (e.g., about 45 scans per second). Alternatively, the simulated signal may be generated using a variable scan rate that is swept throughout a range of scan rates. Alternatively, as described below with respect to an exemplary infrared transmitter/receiver pair, the scan rate of the scanning beam may be measured where a receiver is available to detect the scanning beam. In this case, once the scanning rate or rates are determined, the signal is generated in block 27 corresponding to this scan rate or rates.

In block 28, the simulated signal is transmitted as light pulses. For purposes of the present invention, the term "light" refers to visible light and infrared light spectra. The rm "pulse" refers to a change in light level where the characteristics of the change are not critical. The light pulses may be generated in any visible or infrared wavelength desired by any light source known in the art, such as an LED, a laser, an infrared transmitter, a backlight of an LCD screen, or a light bulb.

FIG. 1A shows a representative bar code 10 that may have been displayed in block 26 of FIG. 2. The bar code 10 includes a quiet zone 12, bars 14, and spaces 16. While FIG. 1A shows a quiet zone 12 being lighter, the quiet zone may alternatively be darker if the scanner is adapted to recognize it. Correspondingly, the bars 14 and the spaces 16 may be inverted such that the bars 14 are lighter than the spaces 16.

Figure 1B:
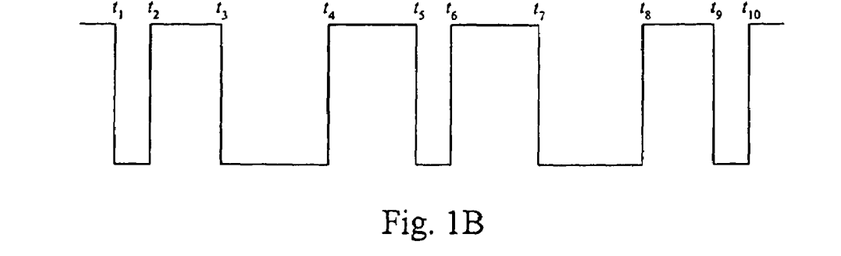
FIG. 1B is a graphical depiction of a signal representing the bar code of FIG. 1A for actively providing transmission information data to a bar code scanner.

FIG. 1B shows an idealized representation of a signal generated in block 27 of FIG. 2 corresponding to the reflection of a scanning beam off a bar code 10 depicted in FIG. 1A. As a scanning beam scans across the quiet zone 12 and the spaces 16, the beam is reflected to the scanner. As the beam scans across the bars 14, however, the beam is absorbed (or at least the reflected beam has a lower amplitude than the beam reflected from the lighter quiet zone 12 and spaces 16). Thus, the amplitude of the beam received at the scanner decreases at times t1, t3, t5, t7, and t9, which correspond to the beam reaching a leading edge of a bar 14, and increases at time t2, t4, t6, t8, and t10, which correspond to the beam reaching the falling edge of a bar 14.

Transmission information data encoded in a bar code format may be actively provided to a sequential bar code scanner by providing a light-based representation of a signal, such as shown in FIG. 1B, to a scanner instead of providing a static bar code image to the scanner. Since many bar code scanner receivers will receive visual wavelength signals, mobile communications devices that have components that operate at these wavelengths can be used to provide an active light representation of the simulated reflected scanning beam to a sequential bar code scanner. The transmission information data may thus be actively provided to current or improved sequential bar code scanners without the requirement of altering the existing bar code scanner infrastructure.

When the bar code scanner receives the beam, the scanner decodes the on/off sequence of the beam to determine the transmission information data being provided, in a manner known in the art.

Sequentially providing such a signal to a sequential bar code scanner further allows for the transmission of bar code information without regard to the physical size and/or resolution limitations of the device display. A bar code representation that might otherwise require an unreasonably wide screen to convey all the information to the scanner, for example, may be provided directly to the scanner in one step from even the narrowest of screens.

Figure 3:
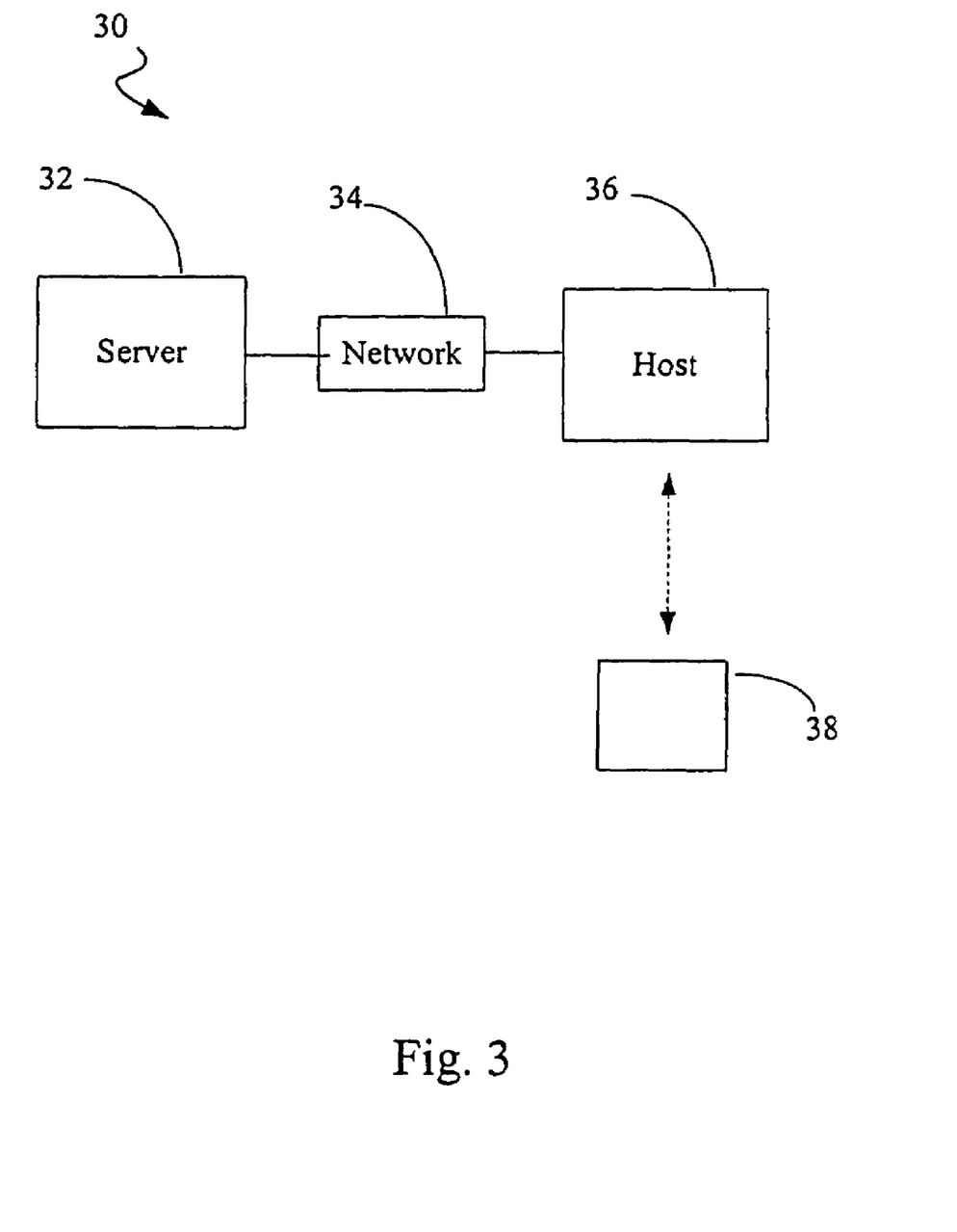
FIG. 3 is a schematic representation of one implementation of a system for providing transmission information data to a bar code scanner from a mobile communications device.

FIG. 3 shows a schematic representation of one implementation of a system 30 for providing transmission information data to a bar code scanner from a mobile communications device. Server 32 is connected to a host 36 via a network 34, such as a local area network ("LAN"), a wide area network ("WAN"), an intranet, an extranet, the Internet, or other known network. The host 36, in turn, is connected to the mobile communications device 38, such as through wireless technology, phone line, dedicated service line ("DSL"), cable connection, or other known remote access technology. In one approach, for example, the server 32 may maintain a database of transmission information data items that are transmitted to the mobile communications device 38 via the host 36. A user of the mobile communications device may remotely select one or more transmission information data items, or the server 32 may provide a transmission information data item that has been selected for the user of the mobile communications device 38 either by the server 32 or some other system and communicated to the server, such as via the network 34. The server 32 retrieves the one or more transmission information data items from the database and provides the transmission information data to the mobile communications device via host 36. In this approach, the mobile communications device 38 receives the transmission information data in block 20 of FIG. 2, and performs the remaining operations depicted in blocks 22, 24, 25, 27, and 28.

Alternatively, some or all of the processing shown in blocks 20, 22, 24, 25, and 27 may be performed upstream of the mobile communications device 38, such as at server 32, at host 36, or at an intermediate location such as a component of network 34. For example, the server 32 may retrieve a transmission information data from a database, either on its own or in response to a request from the user of the mobile communications device 38, identify a bar code type (block 24), encode the transmission information data into a bar code format such as the array described above (block 25), and transmit the array to the mobile communications device. If the mobile communications device 38 does not already have representative information to display on the screen of the device 38 (block 22), the server 32 may also provide this information to the mobile communications device 38. Information provided to the mobile communications device 38 may be encrypted and/or compressed as known in the art.

FIGS. 4 and 5 show pictorial representations of a wireless phone 40 and a PDA 50 that include an alternative signal generator that may be used within the scope of the present invention. The wireless phone 40 and the PDA 50 include visible light sources, such as light emitting diodes ("LEDs") 42 and 52, respectively, that may be used to present bar code information to a sequential bar code scanner. Such LEDs are commonly used for such purposes as power management, including battery management, and user notification. The LEDs 42 and 52 of the wireless phone 40 and the PDA 50, respectively, may be alternated between on and off or between relatively bright and relatively dark settings in accordance with the simulated signal to simulate the movement of the reflection of a scanning beam across a conventional bar code. Thus, the LEDs 42 and 52 may be set to their brightest setting for a duration corresponding to the time period during which the simulated scanning beam would transition from the falling edge to the leading edge of a bar, and to their darkest setting for the duration corresponding to the time period during which the simulated scanning beam would transition from the leading edge to the falling edge of a bar. If the light source is capable of emitting different colors such as red and blue, the light source may be alternated between different colors to simulate a reflection from a visual image of the bar code format.

FIG. 6 shows a perspective view of a personal data assistant ("PDA") 60 that may alternatively be used to actively provide transmission information data within the scope of the present invention. The PDA 60 includes an infrared ("IR") transmitter/receiver pair 62 that is typically used in mobile communications devices to exchange digital information. The PDA 60 may, for example, be operating under such operating systems as the Palm™ operating system and the Windows™ CE operating system. Alternatively, other electronic devices that include a transmitter/receiver pair, such as an IR transmitter/receiver pair, may also be used within the scope of the present invention. In one approach, the PDA 60 selects a scan rate for the scanning beam, calculates a signal that corresponds to the reflection of a simulated scanning beam moving across a bar code image at that scan rate, and transmits that signal via the transmitter of the IR transmitter/receiver pair to the scanner.

Figure 7:
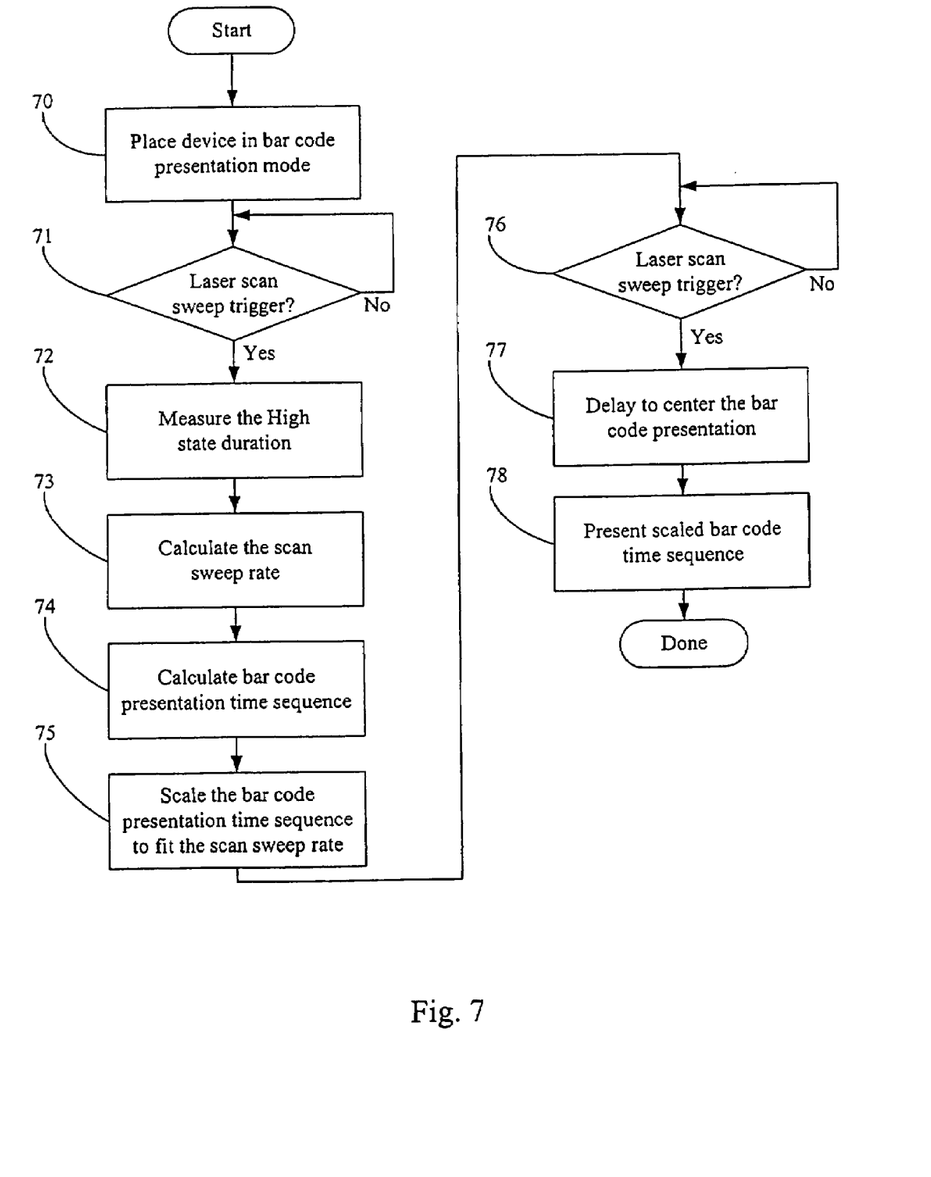
FIG. 7 is a flow chart of a method of synchronizing an active presentation of transmission information data to a scan sweep of a bar code scanner.

In an alternative approach, the receiver of the pair may be used to detect the scan rate of a sequential bar code scanner beam over one or more scan cycles such as shown in FIG. 7. The PDA 60 may then calculate the scan rate of the beam and synchronize its transmission of a simulated reflected scanning beam to the scanner. If no beam is detected, a default scan rate may be used. If the IR transmitter/receiver pair 62 is not dedicated to the presentation of bar code information for the mobile communications device and the device cannot distinguish the scanning beam from other IR transmissions, the PDA 60 is placed in a bar code presentation mode in block 70. In this mode, when a scanning beam of a bar code scanner is detected in block 71 at the receiver of the IR transmitter/receiver pair 62 of the PDA 60, an interrupt trigger is generated indicating the start of the sequential scanner beam sweep. If a signal at a pin of the processor is normally low (logical state) when no signal is detected and high when a signal is detected at the receiver, the processor monitors the receiver and determines the duration that the pin stays at the high logical state in block 72. This time corresponds to one scanner sweep. The processor can determine the scan rate from the duration of one scan sweep in block 73. For example, a scan sweep of about 33 milliseconds corresponds to a scan rate of about 30 scans per second and a scan sweep of about 10 milliseconds corresponds to a scan rate of about 100 scans per second. The processor also calculates the time sequence of the scan sweep that corresponds to the leading and ending quiet zones 12, and the bar code data zone in block 74. This time sequence is scaled for presenting the simulated reflected scanning beam to the scanner in one scan sweep in block 75. When another incoming trigger is detected corresponding to the start of a new scan sweep in block 76, the processor delays the start of block 78 to center the presentation of bar code data in the scan sweep of the scanner, and the simulated reflection of the scanning beam corresponding to the bar code is transmitted via the IR transmitter of the IR transmitter/receiver pair 62 in block 78.

Figure 8:
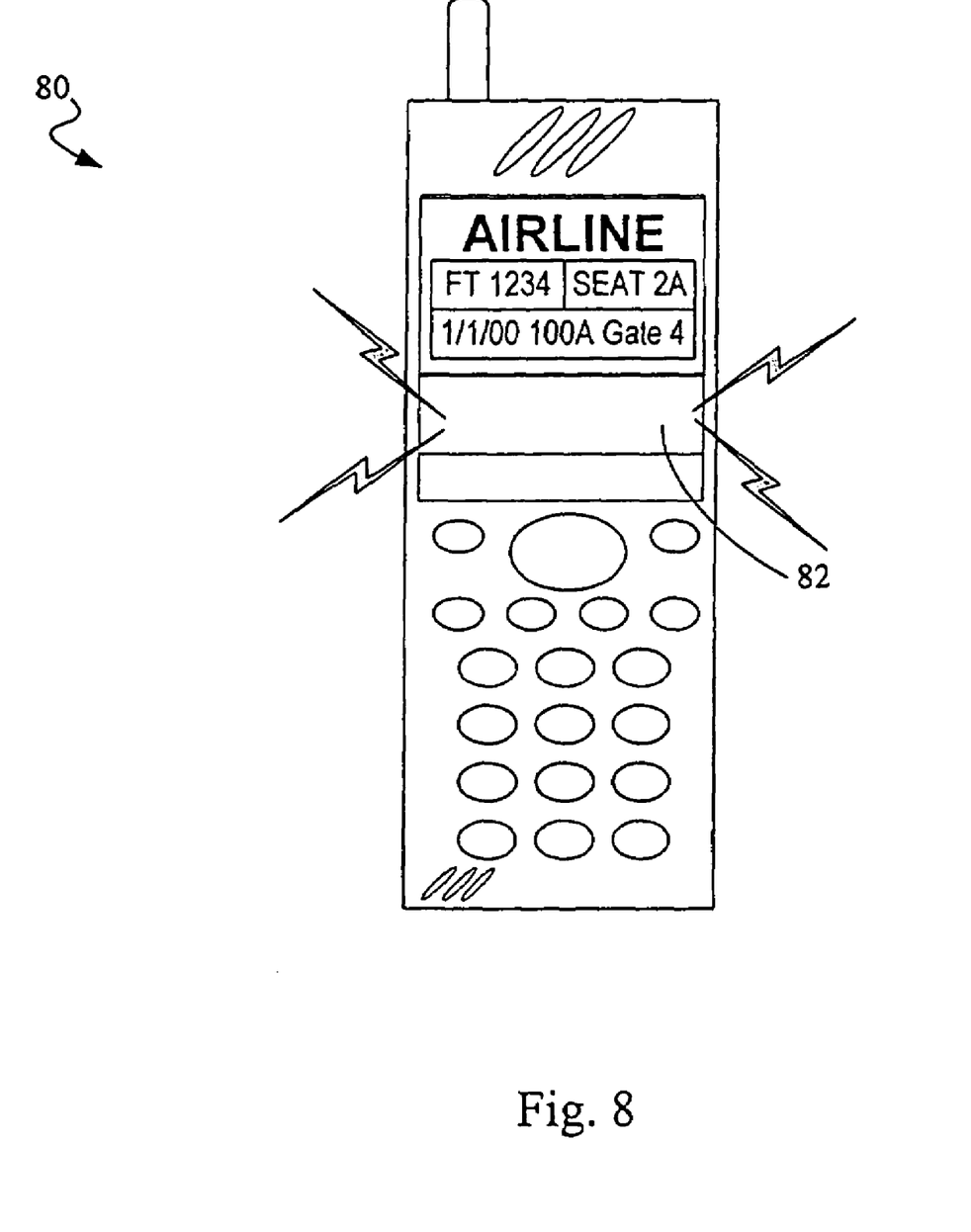
FIG. 8 is a pictorial representation of an electronic device in which a display screen is used to actively provide a signal representing transmission information data to a bar code scanner.
Figure 9:
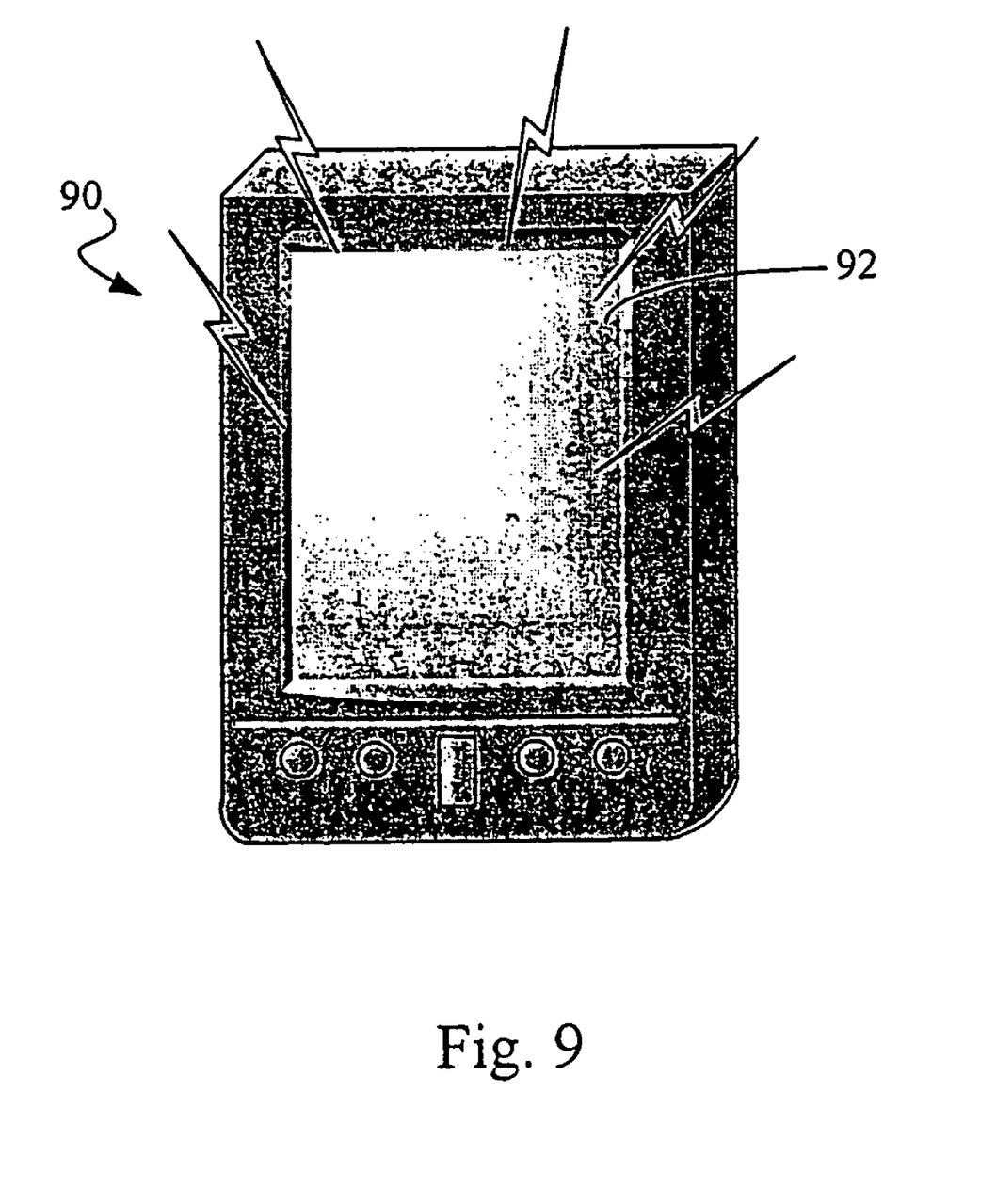
FIG. 9 is a perspective view of an alternative electronic device in which a display screen is used to actively provide a signal representing transmission information data to a bar code scanner.

FIGS. 8 and 9 show pictorial representations of a wireless phone 80 and a PDA 90 that include displays 82 and 92, respectively, that may be used to present transmission information data to a sequential bar code scanner within the scope of the present invention. The displays 82 and 92 of the wireless phone 80 and the PDA 90, respectively, may be alternated between on and off, or between relatively bright and relatively dark settings, or between different colors such as red and blue, to simulate the movement of a scanning beam across a conventional bar code. Thus, the displays 82 and 92, or at least a significant part thereof, may be set to their brightest setting for a duration corresponding to the time period during which the simulated scanning beam would transition from the following edge to the leading edge of a bar, and to their darkest setting for the duration corresponding to the time period during which the simulated scanning beam would transition from the leading edge to the following edge of a bar. Alternatively, any aspect of the display that may be changed and recognized by a bar code scanner receiver may be utilized. A display backlight, for example, may be turned on and off to provide the simulated scanning beam signal to the receiver. In some instances, combining the techniques may be most effective. For example, reflected light may be simulated by a white screen with a backlight on, while absorbed light may be simulated by a dark screen with a backlight off.

The displays 82 and 92 may be used to display the representative information of the transmission information data and to actively provide the transmission information data to a bar code scanner in various manners. For example, the display screen may display the representative information first and, after a prescribed time period or after the user changes the state of the mobile communications device such as by pressing a button, clear the display and begin to actively provide the transmission information data to the bar code scanner. Alternatively, such as shown in FIG. 8, different portions of the display may be used for display the representative information data and to actively provide the transmission information data. The display may also be used to display the representative information and to simultaneously actively provide the transmission information data such as by flashing the back light, changing the colors, inverting the display, or other changes in the display characteristics.

Although the approaches listed above for actively presenting bar code information is generally preferred for use with sequential scanners, there are instances in which statically displaying a bar code on the display of a mobile communications device may be preferred. For example, when displaying a bar code to a CCD scanner, which takes a digital image of the bar code and decodes the image using software, it may sometimes be preferred to present the bar code statically on the display of the mobile communications device. Alternatively, it may be desired to present the bar code information both statically and actively for presentation to a wider range of bar code scanners. When bar codes are statically displayed on a display, such as that of a mobile communications device, the present invention contemplates the following methods and apparatuses for improving the presentation of the bar code.

Figure 10:
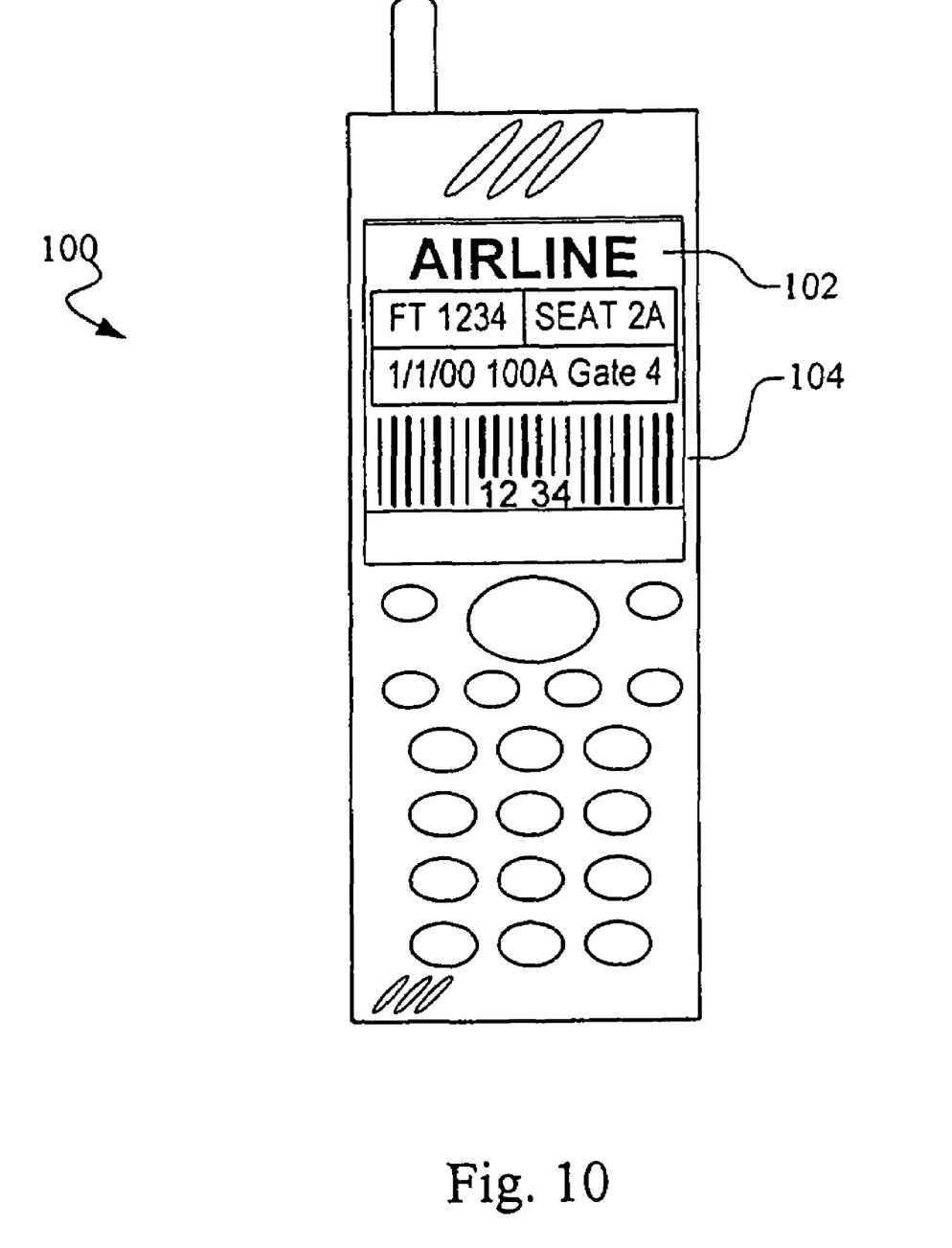
FIG. 10 is a pictorial representation of an electronic device in which a bar code is statically presented on a display of the electronic device for presentation to a bar code scanner.

FIG. 10 shows a pictorial representation of a bar code 104 statically depicted on a display 102 of a wireless phone 100. In one approach, the brightness and/or contrast of the display may be adjusted in order to increase the reliability of a scanning process. The device may, for example, automatically adjust the display to the maximum brightness and/or contrast when a bar code is displayed. In another embodiment where the device includes a color display 102, at least one element of the barcode is depicted in color. The bar code 104 may be presented in colors preferably located at opposite ends of the visual light spectrum. In this embodiment, a a scanner may accept one of the colors, but more effectively reject the other color. A bar code depicted with red spaces and blue bars, for example, is more easily accepted by a scanner than a bar code depicted on a black and gray LCD display.

While the embodiments described above depict particular electronic devices that may be used within the scope of the present invention, many different types of mobile communications devices are well known and commercially available today, and a myriad of new mobile communications devices are likely to be introduced. These devices exhibit great variety in their user input capabilities and display capabilities. Examples of mobile communications devices include personal data assistants ("PDAs") operating under such operating systems as the Palm™ operating system and the Windows™ CE operating system, a SmartPad notepad such as is available from Seiko Instruments of Torrance, Calif., and equipped with a wireless PDA device, two-way pagers, some types of consumer wireless Internet access devices ("CADs") and Internet appliances, GSM phones, WAP-enabled phones, as well as J2ME (Java 2 Micro Edition) phones available from various manufacturers such as Nokia of Helsinki, Finland, and Telefonaktiebolaget LM Ericsson of Stockholm, Sweden, personal communication system ("PCS") phones, multi-function wireless "smart" phones such as the iMODE phone available from NTT Docomo of Tokyo, Japan. Further examples of electronic devices that may be used within the scope of the present invention include a communications-enabled personal data assistant. Many different kinds of communications-enabled PDAs are available. Examples include the Palm VII connected organizer, which is available from Palm Computing, Inc. of Santa Clara, Calif.; the pdQ smartphone, which is available from QUALCOMM Incorporated of San Diego, Calif.; and a variety of PDAs suitably equipped with attached wireless modems such as, for example, the Palm III and V connected organizers with Minstrel® Wireless Palmtop Modems from Novatel Wireless Inc. of San Diego, Calif., which are distributed by Omnisky Corp. of Palo Alto, Calif. Other examples include a number of devices based on the Windows™ CE operating system such as the various devices available from, for example, Compaq Computer of Houston, Tex., Hewlett Packard of Palo Alto, Calif., Casio Corporation of Tokyo, Japan; and the Revo organizer available from Psion PLC of London, England. Another illustrative platform is the Wireless Internet Device ("WID"), a type of device that includes the functionality of a phone as well as a PDA, WAP browser, and HTML browser. An example of a WID device is the communicator platform, which is being developed by Ericsson. Any suitable wireless technology may be used, including, for example, GSM, CDMA, TDMA, GRPS, and UMTS. Examples of user input capabilities offered by these devices include keypad, keyboard, stylus, ink, handwriting recognition, voice recognition, and so forth. Examples of display capabilities offered by or suitable for these devices include liquid crystal ("LCD") displays, thin film transistor ("TFT") displays, eyeglass displays (also know as personal viewing devices), heads up displays, and so forth. Techniques for enabling graphical images such as bar codes to be shown on these devices are well known in the art, and include, for example, bit maps; JIF, GIF and other graphical file types; and instructions that upon execution recreate the image.

The description of the various embodiments set forth herein is illustrative of our invention and is not intended to limit the scope thereof, as variations and/or modifications are possible. Alternatives and equivalents may be apparent from this description. These and other variations and modifications of the embodiments disclosed herein may be made without departing from the scope and spirit of the invention.

What is claimed is:

1. A method of providing transmission information to a bar code scanner from a mobile digital device comprising a display screen having a variable light level, comprising:
   providing transmission information as bar code formatted transmission information in the device;
   generating in the device a signal from the bar code formatted transmission information to simulate a reflection of a scanning beam being moved across a static visual image of the bar code format; and
   controllably varying the light level of the display screen to transmit the signal as light pulses from the display screen.

2. The method of claim 1 wherein the providing step comprises:
   acquiring the transmission information from a source external to the device; and
   encoding the transmission information into the bar code formatted transmission information, in the device.

3. The method of claim 2 further comprising:
   storing the transmission information in a memory of the device; and
   reading the transmission information from the memory;
   wherein the transmission information encoded in the encoding step is acquired from the memory in the reading step.

4. The method of claim 2 wherein the acquiring step comprises acquiring the transmission information from a personal computer.

5. The method of claim 2 wherein the acquiring step comprises acquiring the transmission information from a personal computer over a wired connection.

6. The method of claim 1 wherein the providing step comprises acquiring the bar code formatted transmission information from a source external to the device.

7. The method of claim 6 further comprising:
   storing the bar code formatted transmission information in a memory of the device;
   wherein the providing step comprises reading the bar code formatted transmission information from the memory.

8. The method of claim 6 wherein the acquiring step comprises acquiring the bar code formatted transmission information from a personal computer.

9. The method of claim 6 wherein the acquiring step comprises acquiring the bar code formatted transmission information from a personal computer over a wired connection.

10. The method of claim 1 wherein:
    the display screen is a LCD display having a backlight; and
    the controllably varying step comprises turning the backlight on and off to transmit the signal as light pulses.

11. The method of claim 10, wherein the controllably varying step further comprises alternating screen contrast while turning the backlight on and off to transmit the signal as light pulses.

12. The method of claim 10, wherein the controllably varying step further comprises alternating screen color while turning the backlight on and off to transmit the signal as light pulses.

13. The method of claim 10 further comprising presenting representative information for the transmission information on the display screen during the controllably varying step.

14. The method of claim 10 further comprising presenting representative information for the transmission information on the display screen at times other than during the controllably varying step.

15. The method of claim 1 further comprising presenting representative information for the transmission information on the display screen.

16. The method of claim 1, further comprising identifying a bar code type, wherein the bar code format corresponds to the bar code type.

17. The method of claim 1, further comprising:
    receiving a scanning beam emitted by a bar code scanner; and
    determining a scan rate of the scanning beam;
    wherein the generating step comprises generating the signal to simulate a reflection of the scanning beam being moved across a static visual image of the bar code format at the scan rate.

18. A mobile digital device comprising:
    a display screen having a variable light level;
    a stored program component for providing transmission information as bar code formatted transmission information in the device;
    a stored program component for generating in the device a signal from the bar code formatted transmission information to simulate a reflection of a scanning beam being moved across a static visual image of the bar code format; and
    a stored program component for controllably varying the light level of the display screen to transmit the signal from the display screen as light pulses readable by a bar code scanner.

19. The mobile digital device of claim 18 wherein the providing stored program component comprises:
    a stored program component for acquiring the transmission information from a source external to the device; and
    a stored program component for encoding the transmission information into the bar code formatted transmission information, in the device.

20. The mobile digital device of claim 19 further comprising:
    a memory;
    a stored program component for storing the transmission information in the memory; and
    a stored program component for reading the transmission information from the memory;
    wherein the transmission information encoded by the encoding stored program component is acquired from the memory by the reading stored program component.

21. The mobile digital device of claim 19 wherein the acquiring stored program component comprises a stored program component for acquiring the transmission information from a personal computer.

22. The mobile digital device of claim 19 wherein the acquiring stored program component comprises a stored program component for acquiring the transmission information from a personal computer over a wired connection.

23. The mobile digital device of claim 18 wherein the providing stored program component comprises a stored program component for acquiring the bar code formatted transmission information from a source external to the device.

24. The mobile digital device of claim 23 further comprising:
    a memory; and a stored program component for storing the bar code formatted transmission information in the memory;

wherein the providing stored program component comprises a stored program component for reading the bar code formatted transmission information from the memory.

25. The mobile digital device of claim 23 wherein the acquiring stored program component comprises a stored program component for acquiring the bar code formatted transmission information from a personal computer.

26. The mobile digital device of claim 23 wherein the acquiring stored program component comprises a stored program component for acquiring the bar code formatted transmission information from a personal computer over a wired connection.

27. The mobile digital device of claim 18 wherein:
the display screen is a LCD display having a backlight; and
the controllably varying stored program component comprises turning the backlight on and off to transmit the signal as light pulses.

28. The mobile digital device of claim 27, wherein the controllably varying stored program component further comprises a stored program component for alternating screen contrast while turning the backlight on and off to transmit the signal as light pulses.

29. The mobile digital device of claim 27, wherein the controllably varying stored program component further comprises a stored program component for alternating screen color while turning the backlight on and off to transmit the signal as light pulses.

30. The mobile digital device of claim 27 further comprising a stored program component for presenting representative information for the transmission information on the display screen while the backlight is being turned on and off.

31. The mobile digital device of claim 27 further comprising a stored program component for presenting representative information for the transmission information on the display screen at times other than while the backlight is being turned on and off.

32. The mobile digital device of claim 18 further comprising a stored program component for presenting representative information for the transmission information on the display screen.

33. The mobile digital device of claim 18, further comprising a stored program component for identifying a bar code type, wherein the bar code format corresponds to the bar code type.

34. The mobile digital device of claim 18, further comprising:
a stored program component for receiving a scanning beam emitted by a bar code scanner; and
a stored program component for determining a scan rate of the scanning beam;
wherein the generating stored program component comprises generating the signal to simulate a reflection of the scanning beam being moved across a static visual image of the bar code format at the scan rate.

35. A system for communicating transmission information comprising:
a mobile digital device having:
a display screen having a variable light level;
a stored program component for providing transmission information as bar code formatted transmission information in the device;
a stored program component of the device for generating in the device a signal from the bar code formatted transmission information to simulate a reflection of a scanning beam being moved across a static visual image of the bar code format; and
a stored program component for controllably varying the light level of the display screen to transmit the signal from the display screen as light pulses; and
a bar code scanner for reading the light pulses from the display screen.

* * * * *